United States Patent [19]
Vizurraga

[11] 3,867,181
[45] Feb. 18, 1975

[54] STABILIZED POLYESTER YARN HAVING A CARBODIIMIDE COATING AND PROCESS OF MAKING

[75] Inventor: Luis R. Vizurraga, Charlotte, N.C.

[73] Assignee: Fiber Industries, Inc., Charlotte, N.C.

[22] Filed: Dec. 21, 1970

[21] Appl. No.: 100,490

Related U.S. Application Data

[63] Continuation of Ser. No. 628,031, April 3, 1967, abandoned.

[52] U.S. Cl.............. 117/80, 8/115.5, 8/115.6, 8/DIG. 4, 117/76 T, 117/138.8 F
[51] Int. Cl..................... B32b 25/02, B32b 27/36
[58] Field of Search................... 8/115.5, DIG. 4; 117/138.8 F, 76 T, 80

[56] References Cited
UNITED STATES PATENTS
3,090,716   5/1963   Stevens.................. 154/52.1

| | | |
|---|---|---|
| 3,193,522 | 7/1965 | Neumann et al............... 260/45.9 R |
| 3,193,523 | 7/1965 | Neumann et al............... 260/45.9 R |
| 3,193,524 | 7/1965 | Holtschmidt et al........... 260/45.9 R |

FOREIGN PATENTS OR APPLICATIONS
889,851   2/1962   Great Britain..................... 8/DIG. 4

Primary Examiner—Leon D. Rosdol
Assistant Examiner—Harold Wolman
Attorney, Agent, or Firm—Thomas J. Morgan; Robert J. Blanke

[57] ABSTRACT

A process for imparting thermal and hydrolytic degradation resistance to a polyester shaped article and the products produced thereby, the process comprising coating the polyester shaped article with a carbodiimide in a manner such that a minimal amount of the available free acid groups of the polyester are reacted with the carbodiimide.

6 Claims, 2 Drawing Figures

STABILIZED POLYESTER YARN HAVING A CARBODIIMIDE COATING AND PROCESS OF MAKING

This is a continuation of application Ser. No. 628,031, filed Apr. 3, 1967, now abandoned.

This invention relates to synthetic linear polyester shaped articles including filaments, yarns and cords useful as industrial fibers which show improved strength when exposed to hydrolytic conditions and/or elevated temperatures such as are experienced by polyester textile products used to reinforce rubber articles. More specifically, this invention relates to a shaped article coating process wherein degradation of the polyester shaped article is inhibited, as well as the coated shaped articles produced thereby.

It is known that in rubber articles such as diverse belting, automobile tires and the like, which are reinforced with cords comprising synthetic linear polyester, that the cord shows superior strength retention under high temperature operating conditions if the free carboxyl group concentration of the polyester comprising the cords is reduced to less than 15 equivalents per million grams. It is further known that the resistance of polyesters to hydrolytic degradation is improved by reduction in the free carboxyl groups of the polyester. Various methods for the stabilization of polyesters by the use of carbodiimides are set forth in U.S. Pat. Nos. 3,193,522; 3,193,523 and 3,193,524. Apparently these prior art process have been predicated on the presumption that hydrolytic degradation is primarily due to the presence of carboxyl groups as indicated in British Pat. No. 889,851 issued Feb. 21, 1962. The British patent states that a process which most nearly achieves the entire elimination of the carboxyl groups will result in a polyester having the highest degree of hydrolytic stability. While maximum reduction of carboxyl end groups may be obtained by incorporating carbodiimides directly into the polyester before the formation of a shaped article this practice may result in spinning problems which are not experienced when a carbodiimide additive is not present in the polyester. Attempts to improve spinning properties by reducing quantities of carbodiimides to low levels (less than 0.25% by weight) have in turn reduced the effectiveness of the carbodiimide as a stabilizing agent.

The automotive tire industry has recently adopted a polyester cord in the construction of motor vehicle tires. Cord used in such an application is subjected to rigorous operating conditions and more specifically, to the combined simultaneous degradative effects of high temperature and moisture. The requirements of the automotive industry are such that polyester tire cords are required which are able to withstand elevated temperatures in the presence of steam for extended periods of time. While hydrolytic decomposition of polyethylene terephthalate is known to be autocatylized by the carboxyl groups present in the polymer, prior art polyester compositions wherein carboxyl groups have been reduced to significantly low levels, have not met the high requirements for degradation resistance set forth by the automotive industry.

It is therefore an object of this invention to provide a polyester shaped article having hydrolytic and thermal stability without removing substantial amounts of free carboxyl groups.

It is another object of this invention to provide a polyester shaped article stabilized against hydrolytic and thermal degradation by means of a carbodiimide without removing substantial quantities of free carboxyl groups from the polyester.

It is still another object of this invention to provide a process for the preparation of polyester textile products having hydrolytic and thermal stability by means of a process employing carbodiimides which does not affect the spinning efficiency of the polyester extrudate.

These and other objects of the invention will become apparent from the following description.

In accordance with this invention, it has now been discovered that a thermal and hydrolytic degradation resistant polyester shaped article may be obtained by coating polyester with carbodiimide in a substantially unreacted state whereby the carbodiimide may, when subjected to degradative temperatures with or without high humidities react in situ with the polyester substrate, thereby exerting its stabilizing effects on the polyester product while the polyester product is being subjected to the otherwise degradative conditions. The term "carbodiimide" as employed herein is meant to include compounds having two nitrogen atoms connected to a carbon atom by double bonds and more specifically, to compounds having the following general formula: $R'-N=C=N-R$ wherein R and R' are radicals independently selected from the group consisting of aryl, alkyl, aralkyl or alkoxy radicals. The term carbodiimide is also deemed to include polycarbodiimides having a plurality of carbodiimide groups. The polycarbodiimides are generally substances of a highly viscous to solid nature, and depending on their molecular weight, they are substances which are more or less sparingly soluble or insoluble in organic solvents. Any suitable polycarbodiimide may be used such as those obtained in accordance with U.S. Pat. No. 2,941,966 which describes a process of preparing polycarbodiimides using polyisocyanates in the presence of catalytic quantities of phospholines and their oxides and sulfides.

Any suitable polyisocyanates may used in accordance with this procedure to prepare polycarbodiimides such as for example, toluylene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate and 2,4,6-toluylene triisocyanate. Other suitable polycarbodiimides can also be prepared from aromatic diisocyanates or polyisocyanates having one or two aryl, alkyl, arakyl or alkoxy substituents in the ortho position to all —NCO groups wherein at least one of these substituents has at least two carbon atoms. Isocyanates of this type are heated in the presence of tertiary amides, basically reacting metal compounds, carboxylic acid metal salts or non-basic organo-metallic compounds.

Isocyanates suitable in the preparation of carbodiimides in accordance with the disclosure of this application include 1,3-diisopropylphenylene-2,4-dissocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3', 5'-tetraethyl-diphenylmethane-4,4'-diisocyanate; 3,5,3',-

5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate.

Specific monocarbodiimides which are suitable for use in this invention are as follows: diisopropylcarbodiimide, dicyclohexylcabodiimide, methyl-tert.-butylcarbodiimide, 2,6-diethylphenyl carbodiimide; di-ortho-tolyl-carbodimide; 2,2'-dimethyl diphenyl carbodiimide; 2,2'-diisopropyl-diphenyl carbodiimide; 2-dodecyl-2'-n-propyl-diphenylcarbodiimide; 2,2'-diethoxy-diphenyl dichloro-diphenylcarbodiimide; 2,2'-ditolyl-diphenyl carbodiimide; 2,2'-dibenzyl-diphenyl carbodiimide; 2,2'-dinitro-diphenyl carbodiimide; 2-ethyl-2'-isopropyl-diphenyl carbodiimide; 2,6,2',6'-tetraethyl-diphenyl carbodiimide; 2,6,2',6'-tetrasecondary-butyl-diphenyl carbodiimide; 2,6,2',6'-tetraethyl-3,3'-dichloro-diphenyl carbodiimide; 2-ethyl-cyclohexyl-2-isopropylphenyl carbodiimide; 2,4,-6,2',4',6'-hexaisopropyl-diphenyl carbodiimide; 2,2'-diethyl-dicyclohexyl carbodiimide; 2,6,2',6'-tetraisopropyl-dicyclohexyl carbodiimide; 2,6,2',6'tetraethyl-dicyclohexy) carbodiimide and 2,2'-dichlorodicyclohexyl carbodiimide; 2,2'-dicarbethoxy diphenyl carbodiimide; 2,2'-dicyano-diphenyl carbodiimide and the like.

The term "polyester" as employed herein is deemed to include any polymeric composition containing ester linkages which may be stabilized against thermal and-/or hydrolytic degradation, such as for instance, the reaction product of a polycarboxylic acid with a polyol. Preferred polyesters are the highly polymeric linear esters obtained by heating one or more glycols of the series $HO(CH_2)_n OH$ where $n$ is greater than 1 but not exceeding 10, with terephthalic acid or an ester forming derivative thereof. The phrase "high polymeric linear esters" may be defined as polyesters which are capable of molecular orientation, as shown by characteristic X-ray patterns, by drawing or rolling. Examples of ester-forming derivatives of terephthalic acid are its aliphatic (including cycloaliphatic) and aryl esters and half-esters, its acid halides and its ammonium and amine salts. Examples of the said glycols are ethylene, trimethylene, tetramethylene, hexamethylene and decamethylene glycols.

Of course, other compositions containing polyester resins as a reaction component or in admixture can also be stabilized by the process of this invention. For example, compositions such as polyester amides, polyester urethanes and polyester ethers can be stabilized. The reaction product of any of the carboxylic terminated or hydroxyl terminated esters set forth above can be reacted with a suitable isocyanate to prepare a polyurethane. In the preparation of polyesteramides, the reaction of a polycarboxylic acid, a polyol and an amine can be carried out simultaneously or in steps in the manner set forth for the preparation of polyurethanes. Of course, aminoalcohols and aminoacids can be used in the preparation of polyesteramides.

The coating operation which is contemplated in this invention may be conducted by any of the well-known systems, such as for instance, dipping, padding, spraying and the like. The coating operation is preferably conducted so as to produce a pickup of carbodiimide in the range from 1 to about 2.5% by weight and preferably from 1.5 to about 2% by weight. The carbodiimide, however, should always be present in quantities sufficient to react stoichiometrically with all available acid groups of the polyester whether present initially or produced by degradation reaction. The coating operation is, however, conducted in a fashion such that substantial amounts of unreacted carbodiimide remain in the finished coated article. Preferably, not more than 50% of the available free acid groups are reacted on completion of coating operations. After coating, the shaped polyester articles are dried at temperatures of from 50° to 200°C for periods of from about 1 second to about 120 seconds, the drying conditions being such that not more than 50% of the available acid groups of the polyester are reacted with the carbodiimide.

The phrase "available acid groups" as employed herein is meant to define both the unionized acid group, —COOH, and the ionized group, —COO⁻. The determination of the concentration of carboxyl groups is made in accordance with the procedure described by Pohl in *Analytical Chemistry*, Vol. 26, page 1614, October, 1954, and is expressed in equivalents per million grams.

A better understanding of the invention may be had from the drawings wherein.

Figure 1:
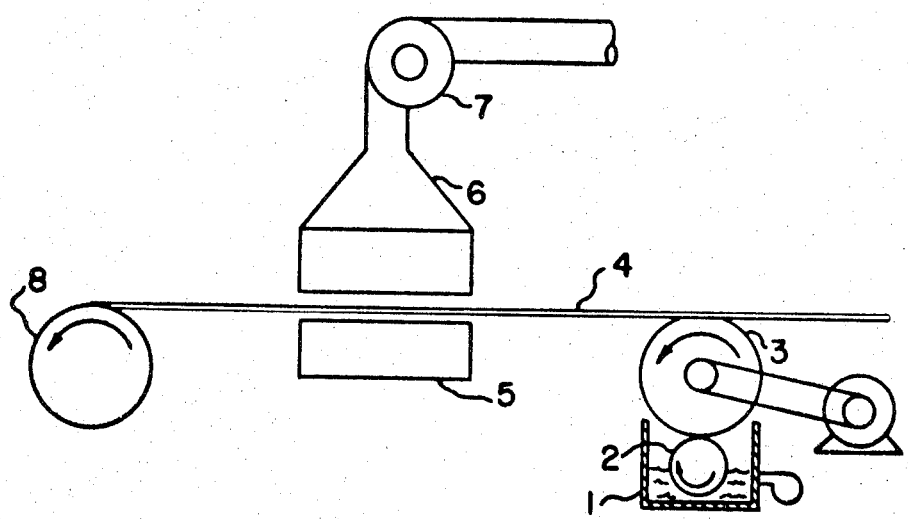
FIG. 1 is a schematic drawing of one means for carrying out the process of this invention.

Turning to FIG. 1, a pad bath 1 containing the carbodiimide of this invention has an immersion roll 2 disposed therein. Immersion roll 2, contacts motor driven pad roll 3 which, in turn contacts and coats a running length of yarn 4 which is preferably presented in the form of a section beam. Coated yarn 7 is then passed over heater member 5 where the solvent or dispersing medium for the carbodiimide coating is driven off. An extraction hood 6 equipped with an exhaust fan 7 is disposed over the coated yarn 4, immediately above heater member 5 so as to remove the solvent or dispersing medium which has been driven from yarn 4 by heater member 5 from the atmosphere. The finished product is then wound onto a take-up roll 8.

The following specific examples for carrying out the process of this invention are given for purposes of illustration. The examples should not, however, be considered as limiting the spirit or scope of this invention.

EXAMPLE I 1,300 denier tire cord yarn is passed into a carbodiimide coating bath. The coating bath is prepared by dissolving 15 grams of di-ortho-tolyl-carbodiimide in 85 grams of benzene which is sufficient to produce a pickup of about 1.5% by weight based on the dry weight of the yarn. The tire cord yarn is coated by means of passage of the yarn over a motor driven pad roll (linear speed of 100 feet per minute) partially immersed in the coating bath at speeds of 1,000 ft. per minute. The coated yarn is then dried in an air-drier at temperatures of about 110°C and at speeds of 1,000 ft. per minute. The finished product which is illustrated as the dotted line in FIG. 2 of the drawings is found to have superior hydrolytic and thermal degradation resistance.

EXAMPLE II

The procedure of Example I is again repeated with the exception that sufficient di-ortho-tolylcarbodiimide is dissolved in benzene to produce a pick-up of 2% by weight on the tire cord yarn. The increased pick-up is achieved by employing the same coating bath as in Example I, but increasing the speed of the pad roll (linear speed of 150 feet per minute) over that employed in Example I. The finished product which is illustrated as the heavy solid line in FIG. 2 of the drawings is found to have superior hydrolytic and thermal degradation as determined by sealed tube tests to be described hereinafter.

EXAMPLE III

A charge of 900.0 lbs. of dimethyl terephthalate, 100.0 gallons of ethylene glycol and 0.360 lbs. of basic magnesium carbonate is placed in an industrial ester-interchange reaction vessel fitted with a distillation column and heated in the absence of air at temperatures beginning at 150°C and rising to 225°C for a period of 3½ hours. During this operation, the reaction mixture is allowed to reflux to 1:1 ratio until the column temperature reaches approximately 195°C which is accomplished in approximately 3.0 hours. The methanol formed during this reaction is distilled out of the reaction vessel. 225.0 ml (50% solution in ethylene glycol) of trimethyl phosphite and 0.36 lbs. of antimonic acid are then added to the reaction vessel and heated at approximately 225°C for a period of 30 minutes at total take-off. The excess of ethylene glycol is removed during this period. The system is then transferred to an industrial polymerization autoclave which is pre-heated at approximately 300° to 310°C. The system is placed under vacuum after the autoclave temperature reaches 230°C and the pressure therein is reduced to less than 1mm mercury. The temperature is then raised to 289°C and maintained for the remainder of the polymerization. The polymerization is allowed to proceed for approximately 230 minutes until 0.88 I.V. is obtained. The polymer is found to have the following properties: color—clear; 0.882 intrinsic viscosity; softening point —259.0°C and 50.0 carboxyl groups equivalents per $10^6$ grams; 1,000 denier tire yarns prepared from this polymer are found to have the following properties: tenacity—8.17 g.p.d.; elongation—9.0% and breaking strength of fabricated tire cord 42.6 lbs. The thermal and hydrolytic degradation by the sealed glass tube test of the fabricated cords are indicated by the light solid line in FIG. 2.

EXAMPLE IV

Figure 2:
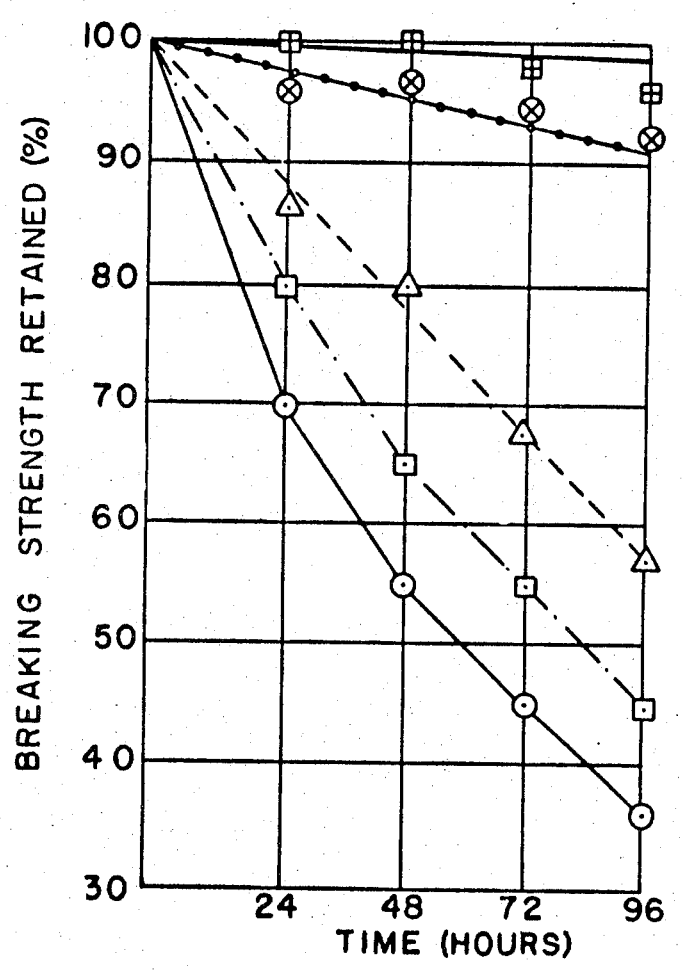
FIG. 2 is a graph plotting % Strength Retention Against Degradative Time in Hours for polyesters stabilized by various methods.

The procedure of Example III is again repeated with the exception that 0.15% by weight of polycarbodiimide is introduced in the polymerization autoclave approximately 30 minutes prior extrusion. The polymer thus obtained is found to have the following properties: color—light straw; 0.888 intrinsic viscosity; softening point—261.1°C; and 25.0 carboxyl groups equivalents per $10^6$ grams. 1,000 denier tire yarns fabricated from this polymer had the following properties: tenacity—8.7 g.p.d.; elongation 9.0% and breaking strength of the fabricated tire cord 45.3 lbs. The fabricated cord which is illustrated in FIG. 2 of the drawings by the broken and dotted line is found to have improved hydrolytic and thermal stability.

EXAMPLE V

The procedure of Example III is again repeated with the exception that carbodiimide is introduced in conjunction with a spin finish used in the melt spinning of the polymer. The spin finish formulation is as follows: White oil 7.7% Lubrol WK (yarn lubricant) 1.8%, Lubrol MOA (yarn lubricant) 2.0%, ethyl stearate 2.9%, Antifoam C (anti-foaming agent) 200 parts per million, 15% of di-ortho-tolyl carbodiimide and sufficient water to make up to 100%. The yarn is passed over a pad roll partially immersed in the spin finish bath to produce a pickup in the range of about 2.0%. Subsequent to the spin finish treatment, the coated yarn is taken through customary drawing operations. The resultant coated product is found to have superior stability to heat and hydrolytic degradation.

EXAMPLE VI

The procedure of Example III is again repeated with the exception that carbodiimide is introduced in conjunction with a spin finish used in the melt spinning of the polymer. The spin finish formulation is as follows: Polycarbodiimide prepared from the condensation of a blend of 2,4 tolylene diisocyanate and 2,6 tolylene diisocyanate to form a molecular weight of about 800, 10 grams; chloroform 20.0 grams; bis(2-ethoxyethyl) ether 10.0 grams; Stantex 110P (textile finishing agent) 13.0 grams; Triton X-200 (a surfactant manufactured by Rohm & Haas) 4.8 grams; Antifoam C (anti-foaming agent) 0.02 grams; cold water 72.2 grams. The composition is stirred for 5 minutes and then employed as a spin finish. The yarn passing through the spin finish bath is found to pick up approximately 1% by weight of carbodiimide, the resulting product exhibiting superior thermal and hydrolytic degradation stability.

EXAMPLE VII 1,300 denier Fortrel tire cord yarn (polyester manufactured by Fiber Industries, Inc.) prepared by a continuous polymerization spin draw process, is run through a spin finishing bath immediately after extrusion, the spin finishing bath having the following composition: Stantex 110P (textile finishing agent) 13 grams; di-ortho-tolyl carbodiimide 16.9 grams; hot water 24.96 grams; Antifoam C (anti-foaming agent manufactured by Dow-Corning) 0.02%. Sufficient water is then added to bring the total up to 100 grams and the composition is stirred for five minutes. The polyester yarn, upon passage through the spin finish bath, is found to have a pickup of about 1.5% by weight of carbodiimide, the resulting end product, which is illustrated by the broken line of FIG. 2 of the drawings, exhibiting superior thermal and hydrolytic stability.

The unexpected improvement in thermal and hydrolytic stability obtained by coating polyester shaped articles with a carbodiimide and allowing for the in situ reaction of the carbodiimide with free acid groups in the polyester may be seen from FIG. 2 of the drawings. In FIG. 2, Tensile Strength Retained in Percent is plotted against Exposure Time in Hours, both the X and Y coordinates being obtained according to the "sealed tube test." The sealed tube test is an analytical procedure which was developed to evaluate the thermal stability of tire cord under conditions which most nearly approximate those experienced in a running automotive tire. In the sealed tube test glass tubing of ½ inch outside diameter is cut into lengths 9.6 inches long. One end of the tube is then sealed. The tire cord sample which has been conditioned in a standard atmosphere for 24 hours is then tested for breaking strength. Four grams of the conditioned tire cord sample are then placed in the tube, the open end of the tube sized down to approximately ⅛ inch outside diameter and the tube allowed one hour to regain moisture. The tube is then sealed, using 1 pound oxygen pressure and a minimum flame and the sealed tube placed in an oven for periods of up to 96 hours at 300° ± 2°F. Every 24 hours one tube is removed from the oven and allowed to cool in a conditioned atmosphere (75 ° ± 2°F at a relative humidity of 55 ± 2%) for 1 hour. After cooling, the tube is broken and the cord tested immediately. All tests for tensile strength are conducted on an Instron machine employing the following conditions: Cross-head speed of 10 inches per minute, short speed of 20 inches per minute, short scale of 50 pounds, load cell capacity D-cells, load cell range 1,000 pounds, clamps aeromatic Instron. The machine is pretensioned for total denier below 3,500 — 4 oz.; total denier above 3,600 and below 7,200 — 8 oz.; total denier above 7,200 — 12 oz. The sample length employed is 10 inches. After breaking, the results are expressed as percent thermal stability according to the following formula:

Percent stability = (the final breaking strength × 100 initial breaking strength)

Sealed tube test data on polyester tire cords prepared according to the method set forth in the Examples are given in the following table:

TIRE "CORDS" BREAKING STRENGTH (LBS.) AFTER SEALED TUBE TEST

| TIME (HRS.) | 0 | 24 | 48 | 72 | 96 |
|---|---|---|---|---|---|
| EXAMPLE | | | | | |
| I (C.P.)* | 69.9 | 67.1 | 67.1 | 65.7 | 64.4 |
| II (C.P.)* | 69.9 | 69.9 | 69.9 | 68.5 | 67.1 |
| III Control (B.P.)** | 42.6 | 29.8 | 23.4 | 19.2 | 15.4 |
| IV (B.P.)** | 45.3 | 36.2 | 29.4 | 24.9 | 20.4 |
| V (B.P.)** | 43.1 | 39.2 | 37.5 | 35.4 | 30.6 |
| VI (B.P.)** | 43.4 | 34.8 | 30.4 | 26.2 | 21.7 |
| VII (C.P.)* | 70.0 | 66.5 | 64.4 | 59.5 | 56.0 |
| Continuous Polyimerization Control | 69.7 | 61.4 | 55.8 | 46.7 | 40.5 |

\* Continuous Polymerization
\*\* Batch Polymerization

Turning once again to FIG. 2, it should be noted that when the sealed tube test data is plotted as Tensile Strength Retained vs. Oven Time in Hours that the polyester tire cords containing a coating of carbodiimide exhibited greatly improved stability as compared with untreated control polyester tire cord (broken line). It should also be noted that the 2% coating of carbodiimide (solid line) represents an improvement over the 1.5% coating (of dotted line).

Having thus disclosed the invention, what is claimed is:

1. An industrial yarn of a linear polymeric terephthalic acid ester of a glycol of the series $HO(CH_2)_nOH$ where $n$ is greater than 1 but not exceeding 10; said ester having free carboxyl end groups and said yarn being stabilized against hydrolytic and thermal degradation by having a carbodiimide coating disposed thereon in amounts sufficient to produce a pickup in the range from 1% to about 2.5% by weight; said carbodiimide being a compound represented by the following general formula

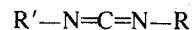

wherein R and R' are radicals independently selected from the group consisting of aryl, alkyl, aralkyl and alkoxy radicals.

2. The article of claim 1 wherein said industrial yarn is tire yarn.

3. The product of claim 1 wherein said yarn is a 1300 denier yarn disposed in a rubber matrix.

4. In a process for the preparation of an industrial yarn of a linear polymeric terephthalic acid ester of a glycol of the series $HO(CH_2)_nOH$ where $n$ is greater than 1 but not exceeding 10 said ester having free carboxyl end groups, the step comprising coating said yarn with a carbodiimide coating in amounts sufficient to produce a pickup in the range of from 1% to about 2.5% by weight said carbodiimide being represented by the following general formula

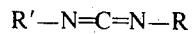

wherein R and R' are radicals independently selected from the group consisting of aryl, alkyl, aralkyl or alkoxy radicals.

5. The process of claim 4 wherein said carbodiimide is a polycarbodiimide.

6. The process of claim 4 wherein said carbodiimide is applied as a finish prior to takeup of said industrial yarn.

* * * * *